United States Patent [19]
Bercz et al.

[11] 3,762,092
[45] Oct. 2, 1973

[54] FISHING LURE CONTAINING A CHEMILUMINESCENT SUBSTANCE

[75] Inventors: Christa V. Bercz, Oaklyn; Jolan S. Rozmanith, Cherry Hill; Jeno P. Bercz, Oaklyn, all of N.J.

[73] Assignee: Lurex, Inc., Cherry Hill, N.J.

[22] Filed: Feb. 12, 1971

[21] Appl. No.: 114,898

[52] U.S. Cl............ 43/17.6, 43/42.09, 43/42.13, 43/42.21, 43/42.35, 43/42.53, 43/44.87
[51] Int. Cl............................................. A01k 85/00
[58] Field of Search................. 43/17.6, 42.22, 17.5, 43/42.09, 42.33, 42.35, 42.32

[56] References Cited
UNITED STATES PATENTS

| | | | |
|---|---|---|---|
| 2,420,286 | 5/1947 | Lacey et al. | 252/188.3 |
| 336,953 | 3/1886 | Scotland et al. | 43/17.6 |
| 1,380,876 | 6/1921 | Warden | 43/17.6 |
| 1,422,841 | 7/1922 | Dey | 43/17.6 X |
| 3,505,754 | 4/1970 | Lawlor | 43/42.22 |

*Primary Examiner*—Robert W. Michell
*Assistant Examiner*—George M. Yahwak
*Attorney*—Woodcock, Washburn, Kurtz & Mackiewicz

[57] ABSTRACT

Refillable containers adapted for the visable display of at least dual-colored light generated from chemiluminescent substances acting in cooperation with luminescent inserts, compositions, or coatings associated with at least one wall of the container. Some containers include refill openings covered by removable closures. Some other containers are formed by snapping together members forming their walls, while others have closures hinged to the container body. The containers are adaptable for use as substantially spill-proof, display, costume jewelry and, most importantly, as substantially pollution-free chemiluminescent light generating fish lures.

4 Claims, 18 Drawing Figures

PATENTED OCT 2 1973 3,762,092
SHEET 2 OF 3
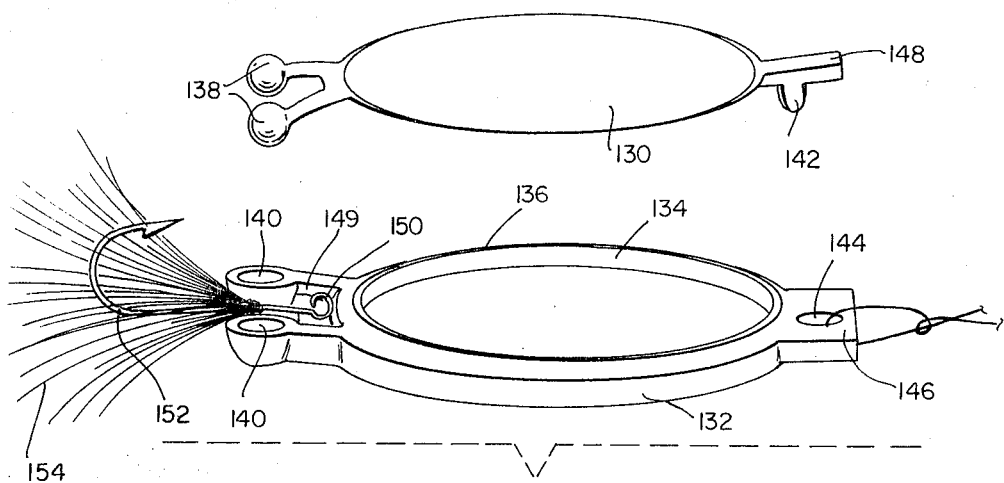
Fig.11
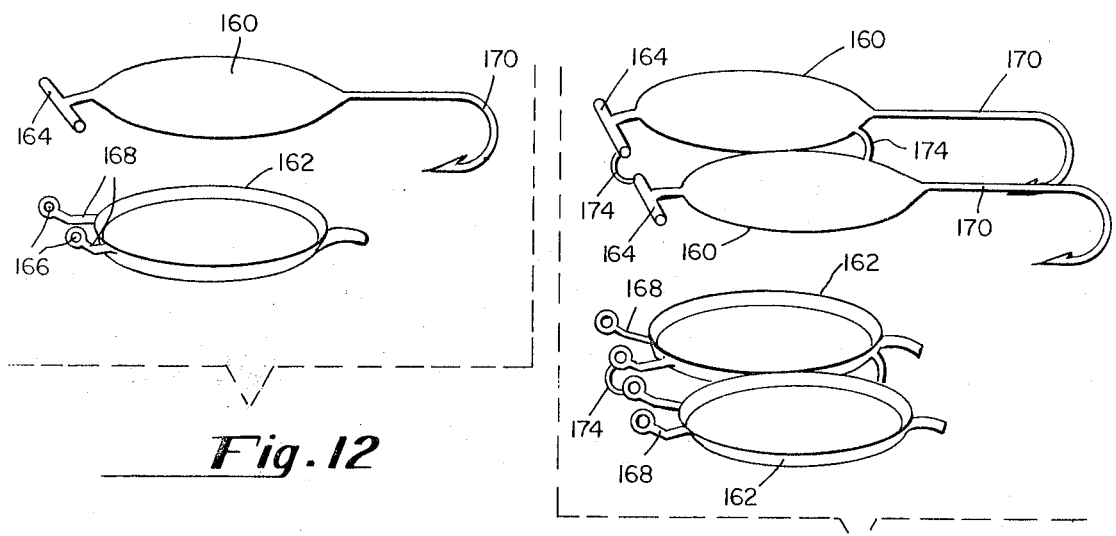
Fig.12
Fig.13
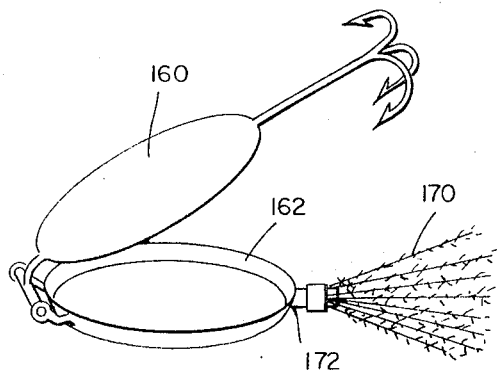
Fig.14
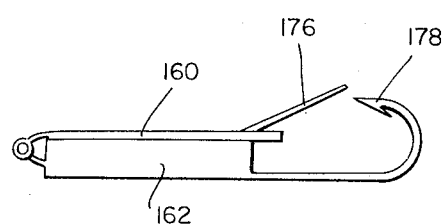
Fig.15

3,762,092

FISHING LURE CONTAINING A CHEMILUMINESCENT SUBSTANCE

BACKGROUND OF THE INVENTION

This invention relates to refillable containers adapted for the visible display of light generated from an activated, chemiluminescent substance.

The generation of light by chemiluminescent reactions is known. When such reactions are conducted in a transparent container, the container will permit the visual display of the light emitted during the course of the chemiluminescent reactions. In general, the prior art containers for chemiluminescent reactants were characterized by constructions which did not permit their being used as refillable, portable, substantially spill-proof, and, most importantly, pollution-free light sources. Hence, the prior art containers for chemiluminescent substances were not suitable in personal decor applications, such as luminescent jewelry, because of danger of spillage, nor were they suitable as fish lures because of danger of spillage and pollution of natural waters.

In fact, chemically generated light emitting containers were not generally used in any of the aforesaid applications because the chemiluminescent material compositions heretofore available did not afford the functioning of such light emitting containers for the necessary duration of several hours with a single filling of chemiluminescent reactants. In our copending application Ser. No. 114,968, filed concurrently herewith and assigned to the assignee of the present invention, we have disclosed new and improved chemiluminescent compositions capable of providing chemiluminescent light emission for over 24 hours, as well as providing repeated high intensity pulses for about one to ten minutes, from a single charge of a chemiluminescent reactant. Such chemiluminescent compositions as disclosed in our aforesaid copending application find particular utility in combination with the refillable, substantially spill-proof and substantially pollution-free containers of the present invention.

SUMMARY OF THE INVENTION

It is therefore a principal object of the present invention to provide an improved refillable container adapted for the visible display of at least dual-color light generated from chemiluminescent substances.

A further object of the invention is to provide a substantially spill-proof and substantially pollution-free container adapted for the visible display of at least dual-color light generated from chemiluminescent substances acting in cooperation with luminescent inserts associated with at least one wall of the container.

Another object of the invention is to provide an improved, substantially pollution-free fish lure adapted for the visible display of at least dual-color light generated from chemiluminescent substances.

We have discovered that an appropriately designed container for chemiluminescent reactants unexpectedly improves the effectiveness of the chemiluminescent materials for use in practical applications. In accordance with the present invention, we have provided an improved container for the efficient utilization of a light emitting chemiluminescent material composition which containers are especially suitable for the purpose of preparing at least dual color luminescent jewelry for decorative displays, demonstrating devices, curiosity articles, signal devices, fishing lures, fishing markers, targets, and in any other useful deployment of a chemiluminescent material composition requiring such a container.

We have found that unexpectedly efficient and useful effects may be obtained by providing a refillable container adapted for the visable display of light emitted from an activated chemiluminescent, light emitting substance comprising a body having walls at least some of which define a liquid-tight, chemiluminescent reaction zone adapted to substantially retain the chemiluminescent substance. The container further includes an opening for ingress and egress of said chemiluminescent substance into and out of said reaction zone. In preferred embodiments, the closure means are provided to cooperate with the edge of the aforesaid openings to establish a liquid-tight seal there with, thereby providing spill-proof and pollution-free characteristics. At least a portion of the wall of the aforesaid body defining the reaction zone is formed of a lgiht transmitting material so as to permit the visible display of the chemiluminescent light generated within said body when the chemiluminescent reaction occurs. Preferably, the container further includes luminescent means, such, for example, as a luminescent insert or coating associated with at least one wall of the body and adapted to cooperate with the light emitted form the chemiluminescent substance when it is present in the reaction zone to produce a visible, at least dual-color light emission from the body.

In accordance with a preferred form of the invention, the container includes at least two liquid-tight, refillable reaction zones physically separated one from the other within the body, each of which zones is adapted to retain a light emitting chemiluminescent material and to display visibly at least dual-color light emitted form the body during reaction of chemiluminescent material(s) in each of the aforesaid zones.

The current techniques of sport fishing often involve the use of highly reflecting flourescent and brightly colored artificial lures which are illuminated by natural daylight. In addition to smell, motion, and sound created by the lure in the water, it appears from experience that the visibility, light reflectance and color of the lure influences its efficacy as a fish attractant. The present invention, therefore, presents an improved lure especially advantageous for fishing under reduced light intensity conditions when used in combination with an activated chemiluminescent material of sufficient light emitting efficiency. Such luminescent artificial lures derive their light generating ability from a variety of chemiluminescent chemical reactions which take place within the lure. As noted above, the improved compositions disclosed and claimed in our copending application Ser. No. 114,968, now abandoned, are especially suitable for this purpose.

In general, the containers of the invention are preferably constructed of transparent materials characterized by good shock resistance and which also maintain high light transmittance properties after prolonged exposure to the chemiluminescent reactants. Examples of suitable materials useful in this connection are the high impact resistant synthetic polymers, such as relatively hard and strong polycarbonate resins, styrene acrylonitrile copolymers as well as ionomeric or softer conventional high or low density polyethylene. When the containers of the invention are to be utilized as fishing or float lures, they may be constructed of a flexible and/or rigid material characterized by good shock and impact resistance as noted above, and may also be constructed in the form of or attached to a lure bearing a likeness to various species which are often utilized as natural lures in sports fishing, i.e., minnows, frogs, flies or worms. The lure may also be equipped with protrusions or be in the form of a helical member to primarily effect the mixing or agitation of an internally contained mixture of chemiluminescent composition and water by the hydrodynamic motion of the lure and thereby improve light emission.

BRIEF DESCRIPTION OF THE DRAWINGS

FIGS. 11-13 are exploded perspective views of other fishing lures embodying the invention;

FIG. 14 is a perspective of another fishing lure embodying the invention;

FIG. 15 is a side view of another fishing lure embodying the invention;

DETAILED DESCRIPTION OF PREFERRED EMBODIMENTS

Figure 1:
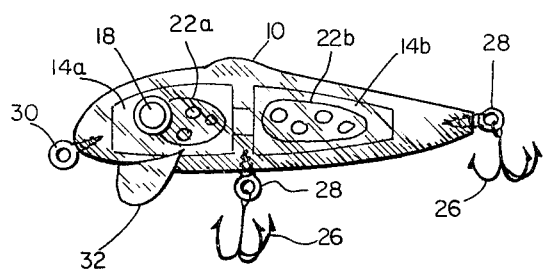
FIG. 1 is a side view of a fishing lure embodiment of the invention.
Figure 2:
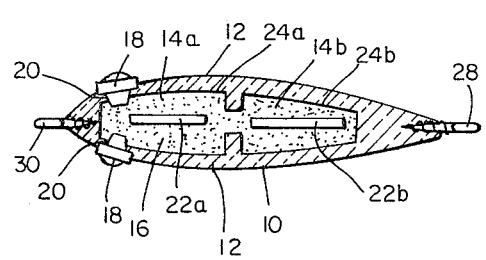
FIG. 2 is a sectional view of a fishing lure of FIG. 1.

An artificial self-illuminating fishing lure in the likeness of a minnow is shown in FIG. 1 and 2 as comprising a body 10 having walls 12 forming refillable reaction chambers 14a and 14b for a chemiluminescent substance or material 16. The chamber 14 is sealed off from the environment by closure means in the form of plugs 18 simulating the eyes of the artificial minnow. The plugs 18 are inserted into openings in the walls 12 and form substantially liquid-tight seals with the edges 20 of these openings.

By removing the plugs 18 from the openings, the openings may be used for the ingress and egress of the chemiluminescent material. In this manner, the lure may be used again and again by simply refilling the chambers 14a and 14b with an appropriate chemiluminescent material 16. I has been found that the chemiluminescent material disclosed in the copending application Ser. No. 114,968, filed Feb. 12, 1971, now abandoned, by applicants herein is particularly suitable for use in fishing lures since such a chemiluminescent material, once activated, is capable of providing chemiluminescent light-emission for periods in excess of 24 hours. Preferably, the chemiluminescent material is embedded in a unctuous matrix storable with respect to the chemiluminescent material capable of releasing the chemiluminescent material when the matrix is exposed to water so as to generate chemiluminescence within the chambers 14a and 14b at a controlled rate.

In order to achieve a multi-color emission from the at least partially transparent walls 12 of the body 10, luminescent material in the form of fluorescent reflecting elements 22a and 22b are located within chambers 14a and 14b respectively. By utilizing different fluorescent materials on or within the elements 22a and 22b, the light generated by the reaction of the chemiluminescent material 16 may be reflected in at least dual colors. In addition, the material of walls 24a and 24b may contain or may be coated with different fluorescent pigments. This too contributes to the at least dual color emission from the lure. A coating may also be applied to the outer surface of the walls 12 to render the body 10 reflective. The at least dual color emission from such a fish lure provides an unexpectedly efficient fish attractant especially when the colors include luminescent red, orange or yellow.

Although the plugs 18 are small, chemiluminescent material 16 can still be easily inserted into the chambers 14a and 14b. In this connection, the chemiluminescent material may be a finely divided solid, a compressed gel or a solution. Due to the liquid-tight seal provided by the plugs 18, such materials may be stored in place within the chambers 14a and 14b for long periods of time before activation by opening the plugs 18 and introducing water.

The phrase substantially liquid-tight embraces a seal wherein 90 percent or more of the material within the container remains after shaking and after a two hour period has elapsed. Note that the chemiluminescent material described in the previously mentioned application, is characterized by a shelf life of at least 6 months.

Hooks 26 for the fish lure of FIGS. 1 and 2 are attached to the body 10 by screw eyes 28 at the end and along the bottom thereof. An additional screw eye 30 is located at the nose of the body 10 providing means for attachment to a fishing line. A fin or hydrodynamic motion guide 32 is also provided at the bottom of the body 10.

Figure 3:
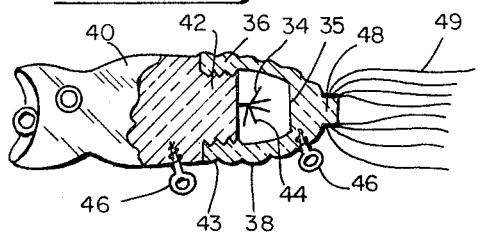
FIGS. 3 and 4 are partial sections of other fishing lures embodying the invention.

In the fishing lure embodiment of FIG. 3, a chemiluminescent reaction chamber 34 is provided by a cavity 35 in a female threaded tail member 36 having substantially transparent walls 38. The chamber is closed by a head member 40 having a male threaded portion 42 which threadedly engages and is sealed against a thread portion 43 the tail member 36. When the head member 40 is unscrewed from the tail member 36, the chemiluminescent material may be inserted into the chamber 34 through the opening in the threaded portion 43.

The fluorescent material in the embodiment is provided by a whiskered insert 44 attached to the end of the threaded portion 42. The fibers of the whiskered insert 42 comprise fluorescent material which is illuminated by the reaction of the chemiluminescent material to produce an at least dual color emission of the fishing lure container of FIG. 3.

A screw eye 46 is again provided for attachment of fishing lines in the manner described with reference to FIGS. 1 and 2. Note also the use of the fluorescent fiber fitting 49 at the end 48 of the tail member 36. This fitting 49 which simulates whiskers or hair contributes to the multi-color light emission by reflecting the chemiluminescence generated within the chamber 34. Other attached fittings simulating scales, feathers, tissues etc. may be utilized for the same purpose.

Figure 4:
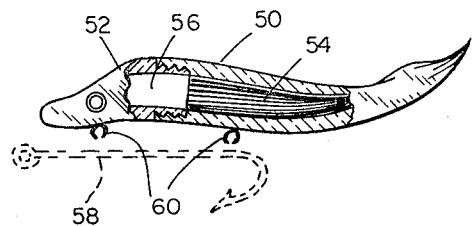

In the embodiment of FIG. 4, a female threaded tail member 50 is again utilized in combination with a male threaded head member 52. Stripes of reflecting fluorescent material 54 are coated on the inner wall of the chemiluminescent reaction chamber 56. When the chemiluminescence generated within the chamber 56 strikes the stripes 54, the multi-color light-emission reveals these stripes in vivid color. In order to further contribute to the multi-color effect, the walls of the container may comprise a dyed fluorescent plastic material. The fishing lure conainer is also provided with means for attaching a hook 58 which has been shown in phantom. The means of attachment comprise clamps 60 which extend from the underside of the lure.

Figure 5:
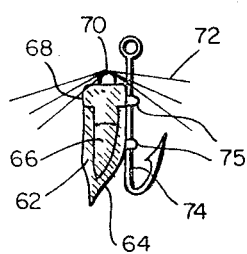
FIGS. 5-8 are views of other fishing lure embodiments of the invention.
Figure 6:
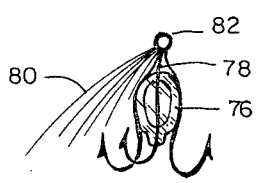
Figure 7:
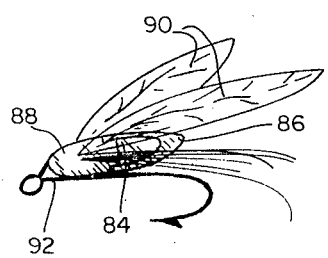

The containers of FIGS. 5–7 represent fishing lures of the fly type. In FIG. 5, a container body 62 having substantially transparent walls 64 defining a reaction chambers 66 is closed with a liquid tight seal by a closure member 68 in the form of a plug. The exterior and end 70 of the plug 68 carries fibers 72 simulating whiskers. Again, the fibers 72 may comprise a fluorescent material so as to provide at least dual color emission from the fishing lure container. The hook 74 is attached to the side of the container at clamps 75.

In the embodiment of FIG. 6, a container 76 constructed in accordance with this invention is wedged within a three-pronged hook 78. Although not fully shown, the container 76 includes a body portion having a cavity and a closure member so as to permit ingress and egress of the chemiluminescent material into the chemiluminescent reaction chamber. In order to provide the multi-color emission from the fly, fluorescent fibers 80 are attached to a ring 82 at the juncture of the hook 78.

In FIG. 7, a container 84 having a body portion 86 and a closure member 88 includes wing-like members 90 extending from the closure member 88. The members 90 may also comprise a flourescent material to provide the multi-color effect for the lure. A hook 92 is also attached to the closure member 88. For all the flies shown in FIGS. 5–7, the closure member is force fitted into the body member. In this manner, a substantially liquid-tight reaction chamber is provided.

Figure 8:
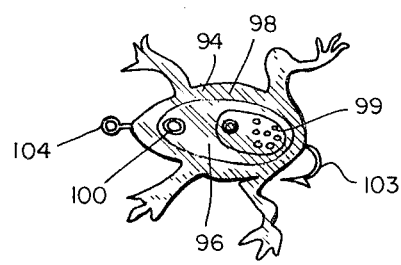

The container in the shape of a frog which is shown in FIG. 8 is formed from a soft plastic transparent material. The container comprises a body member 94 having a cavity forming a reaction chamber 96 within the body walls 98 and a closure member in the form of a plug 100 simulating the eye of a frog. Fluorescent beads 99 which are introduced into the chamber 96 with the chemiluminescent material, result in at least dual color light emission from the frog-like container. A hook 103 simulates the tail of the frog at the posterior end of the frog while an eye 104 is threaded into the frog at the anterior end.

Figure 9:
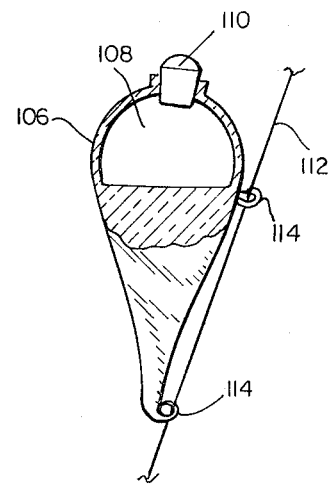
FIG. 9 is a partial sectional view of a bobber embodying the invention.

In FIG. 9, the invention is embodied in a float wherein a container in the form of a bobber for use in fishing is shown. The container comprises a body 106 defining a chemiluminescent reaction chamber 108 which is sealed off with a plug 110. Note the means of attaching the line 112 to the bobber in the form of clamps 114. In addition to the bobber, the invention may be embodied in other types of floats for use in fishing including markers for night fishing.

Figure 10:
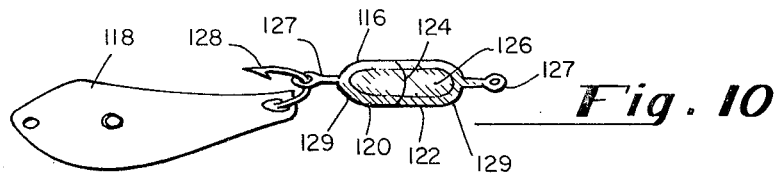
FIG. 10 is another embodiment of the invention showing a container attached to a fishing lure.

In FIG. 10, a container 116 is shown attached to a spoon-type lure 118. The container 116 may comprise two press fit members 120 and 122 forming a liquid-tight seal at a joint 124 with an interior chemiluminescent reaction chamber 126 defined by walls 129 which may be coated with fluorescent material. Each end of the container includes integral eye elements 127 which serve as a means of attachment to a fishing lure such as the spoon-type lure 118. Note that a hook 128 of the lure 118 conveniently extends through the opening in the eye 127. Although the container 116 is shown as attached to the fishing lure 118, a similar container may be utilized in a number of applications. For example, such a container can be utilized in conjunction with costume jewelry where multi-color light emission may be equally desirable.

The fishing lure of FIG. 11 comprises a closure member or lid 130 which is hinged and latched on a container body 132. A reaction chamber 134 is sealed off along an edge 136 when balls 138 are inserted in sockets 140 and a latch member 142 is snapped in place in an opening 144 in a projection 146. Note the manner in which the projection 146 is arched downwardly and a tab 148 associated with the latch member 142 is arched upwardly so as to permit the fisherman's finger to release the latch and open the lid for either replacing or reactivating the chemiluminescent material within the chamber 134. Another socket 149 which is located adjacent the sockets 140 in the body 132 receives the eye 150 of a hook 152. Fluorescent fibers 154 may be utilized in conjunction with the hook 152 to provide the at least dual color emission from the container. Note that the hook as well as the fibers 154 may be removed and replaced once the lid 130 is lifted to the exploded position shown in FIG. 11. In this manner, fibers of different colors may be utilized in conjunction with the hook 152.

Substantially all plastic lures are shown in FIGS. 12–15. In FIG. 12, a lid 160 is hinged from a container body 162 by inserting the integral T-shaped element 164 through openings 166 in the hinge arms 168. An integral plastic hook 170 extends from the opposite end of the lid 160. The lure of FIG. 14 is substantially identical and shows the assembled hinge. A feathered or plastic skirt 170 extends from the tab 172. In order to provide the dual color light emission, the skirt 170 may include fluorescent material. In the alternative, the fluorescent material may be applied to the body 162 and the lid 160 in the form of a coating or by other means described in the foregoing.

FIG. 13 shows a pair of lures substantially identical to the lure of FIG. 12 with the disruptable links 174. These permit the lures to be used in tandem or to be purchased in a string and separated from the string as needed. The lure of FIG. 15 is similar except for a weed guard 176 which extends from the tab 172 to a point adjacent to the barb 178 of the hook.

The lures of FIGS. 12–15 are preferably made of a transparent polymer having a tensile strength exceeding 8,000 psi. In this connection, polycarbonate resins, ionomeric resins, styrene-acrylonitrile copolymers (SAN) may be utilized. It may also be desirable to form the body 162 from a more flexible material than the lid 160 and thereby provide additional flexibility for the arms 168. Accordingly, it may be desirable to utilize a flexible material such as polyethylene for the body 162. Preferably, the body 162 and the lid 160 are made of two different materials or have two different coatings or pigments to emit dual colors in cooperation with the chemiluminescent material.

Figure 16:
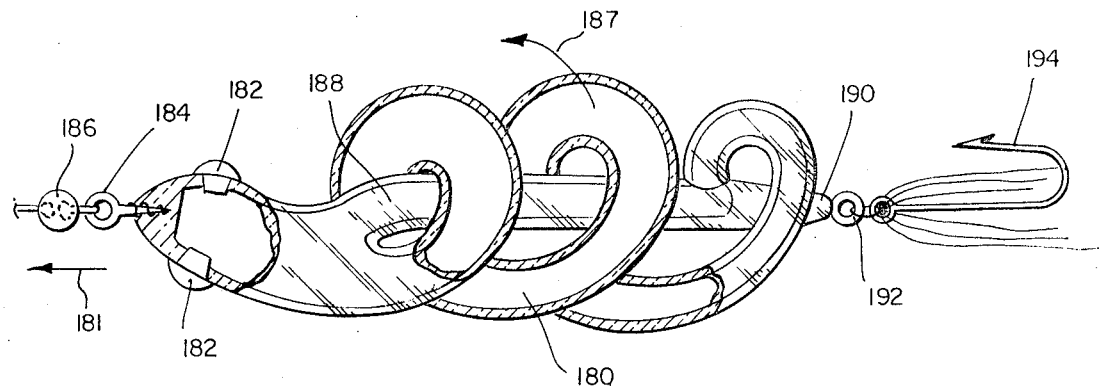
FIGS. 16 and 17 are further fishing lure embodiments of the invention.

A self-illuminating helically tubular fishing lure is shown in FIG. 16. The main body of the helical vessel 190 is preferably equipped with one or two tightly fitting plugs 192 and a screw eyelet 194 for attachment to a rotating ball swivel 196, enabling the free rotation of the lure in the direction of the arrow 197. Upon trolling in water, the lure rotates and the chemiluminescent material is propagated in the helical vessel 190 in a direction opposite to the trolling direction 191. When the material arrives at the end of the helix, the mixture returns through a linear return tube 198 to begin the circulation through helical part over again. The end of linear return tube 100 is equipped with an eyelet 192 providing means for attachment of a hook and decoration 104. The continuous motion of chemiluminescent material as provided by the circular motion of the lure results in an improved mixing of chemiluminescent components in the lure. As a result, light of improved intensity is emitted by the hydrodynamic rotary motion of the lure. By providing at least two different pigments in or coatings on the vessel 180, at least dual color light emission may be achieved.

Figure 17:
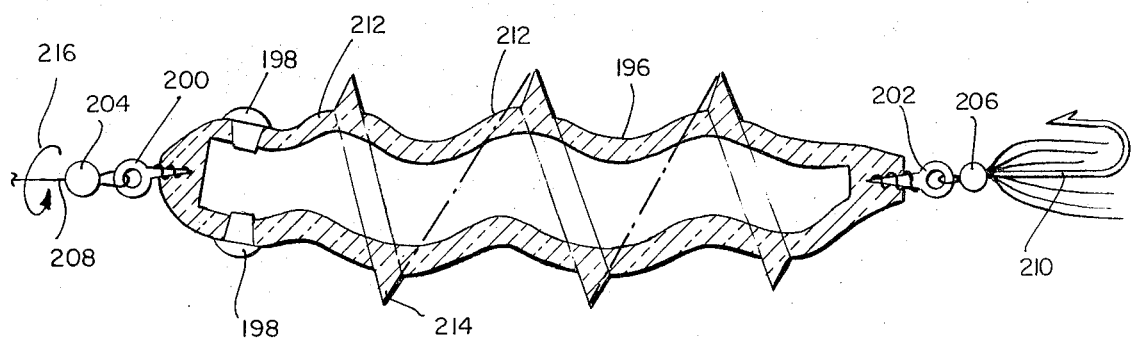

Another form of the helically stirred chemiluminescent lure is shown on FIG. 17. A longitudinally twisted transparent plastic body 196 of the lure is equipped with sealing plugs 198 and screw eyelets 200 and 202 to accommodate ball swivel connections 204 and 206 to a line 208 and a hook 210. The longitudinally twisted body is provided with elevated ridges 122 with continuously running baffles or trailing edges 214. When the helical chemiluminescent lure is trolled in water, the baffles cause the lure to rotate as shown by curved arrow 216, thereby continuously mixing the contents of the lure, and causing intense light emission which is accompanied by a rotating and wobbling motion of the light emitting chemiluminescent mixture in the lure. Again, dual color light emission may be achieved by utilizing different coatings or pigments for the plastic body 196.

Figure 18:
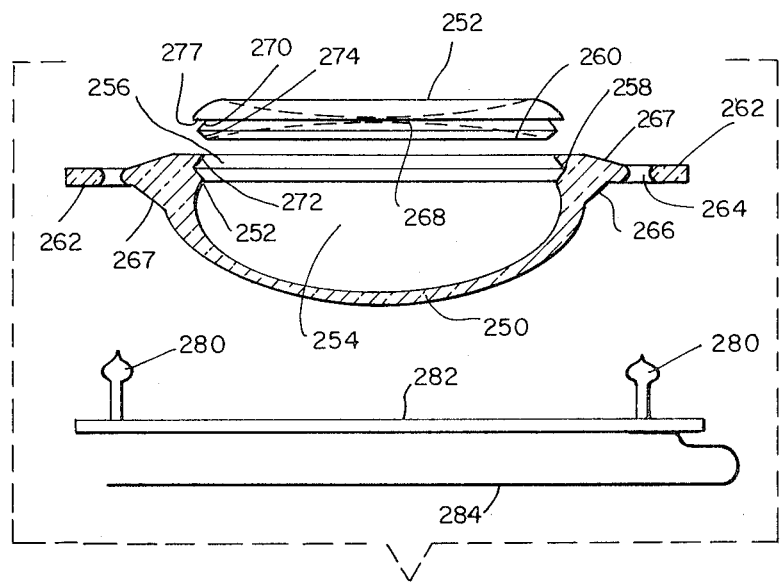
FIG. 18 is an exploded sectional view of a container and mounting embodying the invention.

A container adapted for removable mounting to permit activation by shaking is shown in FIG. 18. The container body comprises a body member 250 and a lid member 252 formed from an at least partially transparent material to define an interior cavity 254. When the lid 252 is removed in the position shown in FIG. 18, the chemiluminescent material may be introduced into the cavity 254 through an opening 256. Once the chemiluminescent material has been introduced, the cavity may be closed to form a liquid-tight reaction chamber body 250 covered by the lid 252 by means of snap-action connecting means including a lip 258 of the body 250 and a rim 260 of the lid 252. In order to achieve at least dual-color emission from the container, the wall of the body 250 or the lid 252 may be coated with a fluorescent material or include a fluorescent pigment therein.

In order to provide for the mounting of the container, integral ears 262 extend from opposite ends of the body 250. These ears include holes 264 which are adapted to receive prongs 280 which snap into place within the holes 264. The prongs 280 are mounted on and extend from a planar backing 282 which carries a pin 284. The pin 284 may be easily fastened on clothing thereby permitting the container and the mounting to be worn as costume jewelry. Since the container can be readily removed from the mounting, the chemiluminescent material within the cavity 254 may be easily activated by merely shaking the container once removed from the mounting which is then snapped back into place on the mounting by reinserting prongs 280 through the openings 264. To provide additional strength in the ears 262, integral reinforcing areas 266 and 267 are also utilized.

Note that the lid 252 is of a variable thickness having a maximum thickness near the rim 60 and a minimum thickness at the center thereof. This variation in thickness provides the important function of establishing a better seal between the lid 252 and the body 250 as pressure within the cavity 254 increases.

In this connection, note that the inclined surface 270 of the rim 260 may be snapped beneath the complementary inclined surface 272 of the lid 258. As the pressure within the cavity 254 increases, the forces applied against the surface 268 maintain good contact between the surfaces 270 and 272. Furthermore, the surfaces 270 and 272 in combination with the adjacent surfaces 274 and 275 of the lid 252 and the body 250 respectively provide snap-action between the lid 252 in the body 250. Thus the snap-actio connection between the lid 252 and the body 252 resists opening due to the internal pressure within the cavity 254 while still permitting the removal of the lid 252 by inserting a fingernal or other object under the edge 277 of the lid 252. The snug fit provided between the lid 252 and the body 250 retains the chemiluminescent material within the cavity 254 even upon vigorous shaking.

Although not shown, the snap-action type container previously described may be utilized for fishing tackle of various kinds by appropriate connections made at the holes 264. For example, a hook may be attached at either hole 264. Furthermore, the container may be outfitted as a fly or utilized as a trailing lure. It is also possible to connect a plurality of the containers together by means of holes 264 to provide a lure having increased light emission.

Although specific embodiments of the invention have been disclosed, it will be appreciated by those of ordinary skill in the art that various changes and modifications may be made which fall within the scope of the invention as set forth in the appended claims.

What is claimed:

1. A refillable container adapted for the visible display of light emitted from an activated chemiluminescent, light emitting substance comprising:
   a body having walls at least some of which define a substantially liquid-tight, chemiluminescent reaction zone retaining said chemiluminescent light emitting substance and including an opening for ingress and egress of said substance into and out of said reaction zone,
   closure means cooperating with the edge of said opening to establish a substantially liquid-tight seal therewith,
   at least a portion of a wall of said body defining said reaction zone being formed of a light transmitting material,
   luminescent means associated with at least one wall of said body and cooperating with the light emitted from said substance present in said reaction zone to produce a visible, at least dual-colored light emission from said body, and
   means for attaching fishing tackle to said containers.

2. The container of claim 1 including at least two liquid-tight, refillable reaction zones physically separated one from the other within said body, each of which zones is adapted to retain a light emitting chemiluminescent material and to display visibly at least dual-colored light emitted from said body during reaction of said material in each zone.

3. The container of claim 1 wherein said luminescent means associated with at least one wall of said body includes a fluorescent coating adapted to produce, in association with the light generated within said reaction zone when it contains said substance, a visible, at least dual-colored light emission from said body.

4. A fish lure adapted for fishing under reduced natural light intensity conditions comprising:

a body having walls at least some of which are transparent and define a chamber containing a chemiluminescent light emitting material, an opening in said body for introducing said chemiluminescent light emitting material into said chamber, closure means cooperating with the edge of said opening to establish a liquid-tight seal therewith and to seal said chamber, a colored, fluorescent, light reflective material associated with on at least a portion of a wall of said chamber, means for attaching a hook to said body, said colored, fluorescent material disposed in cooperative relationship with light generated by said chemiluminescent light emitting material present in said zone to produce a visible, at least dual-color light emission from said body.

* * * * *